United States Patent [19]

Reichner

[11] Patent Number: 4,888,254
[45] Date of Patent: Dec. 19, 1989

[54] LOW CIRCUMFERENTIAL VOLTAGE GRADIENT SELF SUPPORTING ELECTRODE FOR SOLID OXIDE FUEL CELLS

[75] Inventor: Philip Reichner, Plum Boro, Pa.

[73] Assignee: Westinghouse Electric Corp., Pittsburgh, Pa.

[21] Appl. No.: 226,570

[22] Filed: Jul. 19, 1988

Related U.S. Application Data

[63] Continuation of Ser. No. 34,245, Apr. 6, 1987, abandoned.

[51] Int. Cl.$^4$ .............................................. H01M 8/10
[52] U.S. Cl. ....................................... 429/31; 429/33; 429/34
[58] Field of Search ...................... 429/33, 30, 32, 34, 429/191, 193, 40

[56] References Cited

U.S. PATENT DOCUMENTS 3,228,798  1/1966  Hart ...................................... 429/40
4,476,196 10/1984  Poeppel et al. ........................ 429/32

Primary Examiner—Anthony Skapars
Attorney, Agent, or Firm—Daniel P. Cillo

[57] ABSTRACT

The porous, self-supporting, elongated electrode is made, having at least two chambers through its axial length, the chambers separated by an electronically conductive member. This electrode can be an air electrode of a fuel cell, having a superimposed solid electrolyte and fuel electrode.

7 Claims, 2 Drawing Sheets

LOW CIRCUMFERENTIAL VOLTAGE GRADIENT SELF SUPPORTING ELECTRODE FOR SOLID OXIDE FUEL CELLS

GOVERNMENT CONTRACT

The Government of the United States of America has rights in this invention pursuant to Contract No. DEA-CO280-ET17089, awarded by the U.S. Department of Energy.

This application is a continuation of application Ser. No. 034,245 filed Apr. 6, 1987, now abandoned.

BACKGROUND OF THE INVENTION

High temperature, solid oxide electrolyte fuel cell configurations, and fuel cell generators, are well known in the art, and are taught by Isenberg, in U.S. Pat. Nos. 4,395,468 and 4,490,444. These fuel cell configurations comprise a plurality of individual, series and parallel electronically connected, axially elongated, generally tubular, annular cells. Each cell is electronically connected in series to an adjacent cell in a column, through narrow cell interconnections extending the full axial length of each cell. This interconnection contacts the air electrode of one cell and the fuel electrode of an adjacent cell, through a metallic coating and a fiber metal felt.

Each fuel cell is formed on a long, electronically insulating, porous support tube, generally made of calcia stabilized zirconia, which provides structural integrity for the fuel cell. Surrounding, and deposited on this support tube, is a thin, porous air electrode, generally about 500 microns to 2000 microns thick, deposited by well known techniques. The air electrode can be comprised of doped or undoped oxides or mixtures of oxides in the pervoskite family, such as $LaMnO_3$, $CaMnO_3$, $LaNiO_3$, $LaCoO_3$, $LaCrO_3$, and the like. Generally surrounding the outer periphery of the air electrode is a gas tight, solid electrolyte, usually of yttria stabilized zirconia. Substantially surrounding the solid electrolyte is an outer, porous, fuel electrode, usually of nickel-zirconia cermet. A single, open end, oxidant injector tube is used in each fuel cell, to flow gaseous oxidant into the cell. The oxidant contacts the support and diffuses through it to the air electrode.

Many improvements have been made to the support tube for the fuel cell. Ruka et al., in U.S. Pat. No. 4,596,750, provided a fluorite type support tube material which would be better able to resist cracking due to migration of lanthanum or manganese materials contained in the contacting air electrode, at fuel cell operating temperatures of about 1000° C. Rossing et al., in U.S. Pat. No. 4,598,028, provided lighter weight, thinner, higher strength support tubes, which utilized a ceramic powder and ceramic fiber combination, allowing reduction of the oxygen path length to the air electrode through the support. Improvements have also been made to the air electrode, for example, Ruka, in U.S. Pat. No. 4,562,124, taught introduction of small amounts of cerium into the air electrode material, to provide a better match of coefficient of thermal expansion with the support tube.

A problem with the air electrode however, is that electronic current flow through the air electrode to the interconnection, which connects the next cell electronically in series, was confined to the circumferential path of the air electrode around the non-electronically conductive cell support tube, and the enclosed central oxidant chamber. This current path resulted in a circumferential voltage gradient, and did not provide for complete uniformity in cell current density. In addition, it has always been difficult to match the thermal expansion coefficients of the support and contacting air electrode, and to prevent some migration of air electrode material into the support at the 1000° C. operating temperature of the cell in a fuel cell generator. What is needed is a new design for the fuel cell, eliminating the problems of circumferential current flow, thermal mismatch, and material migration, while still providing a strong support for the air electrode, electrolyte and fuel electrode.

SUMMARY OF THE INVENTION

The aforementioned needs have been met and problems solved by the present invention, which in its broadest aspect provides a porous, self-supporting, axially elongated, electrode structure, having at least two chambers through its axial length, the chambers being separated by electronically conductive electrode material. This provides, in its simplest embodiment, at least one electronically conductive interior partition, preferably the same composition as the rest of the electrode, with elimination of the separate support tube. Electrolyte and fuel electrode layers can be deposited over the air electrode to form annular cells, which can be electronically connected in series and also in parallel to similar adjacent cells. The term "annular", is used to describe a variety of cross-sections, for example, circular or square cross-sections.

This elongated electrode configuration provides a plurality of interior chambers, and permits the conductive partition member to help electronically connect the interconnection to the farthest points on the electrode, helping to eliminate circumferential current flow and to reduce circumferential voltage gradients. The elimination of the separate support tube reduces overall cell costs, eliminates one deposition step in manufacturing, and eliminates thermal mismatch and material migration problems. An oxidant injector tube can be used in each of the inner oxidant chambers, or the chambers can be interconnected at one end to perform both supply and exhaust functions.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
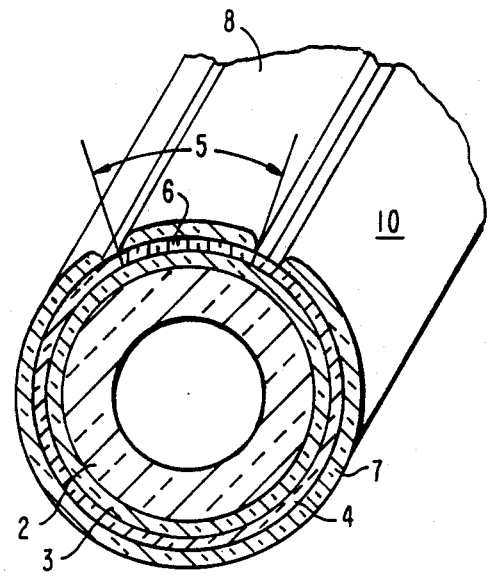
FIG. 1 is a schematic view in section, showing the separately supported, prior art fuel cell design.

Referring now to FIG. 1, the supported, prior art fuel cell 10, having a thick support tube 2, which provides structural integrity to the cell, is shown. The support tube was typically comprised of calcia stabilized zirconia, forming a wall porous to gas permeation, approximately 1 mm to 2 mm thick. Surrounding the outer periphery of the support tube 2 was a porous air electrode or cathode 3. The cathode 3 was typically a composite oxide structure which was deposited onto the support tube through well-known techniques such as plasma spraying, or spraying or dipping in a slurry followed by sintering. The thin electrode layer 4 is shown enlarged for clarity.

Figure 3:
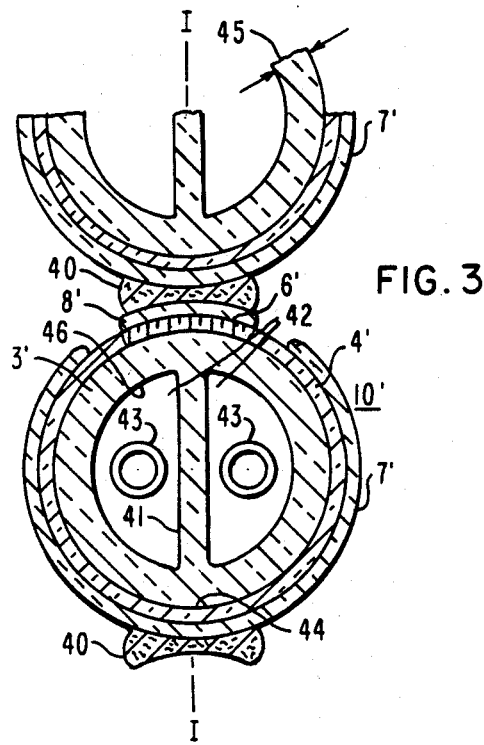
FIG. 3 is a section through two adjacent cells of this invention, showing one self supporting electrode design, and interconnection between cells.

The prior art support tube is eliminated in the fuel cell design of this invention, one embodiment of which is shown in FIG. 3, which utilizes a thicker air electrode or cathode 3', having one central partition rib dividing two interior chambers. This air electrode may be a chemically modified oxide or mixture of oxides including $LaMnO_3$, $CaMnO_3$, $LaNiO_3$, $LaCoO_3$ and $LaCrO_3$. A preferred material is $LaMnO_3$ doped with Sr. Over the electrode is a gas-tight solid electrolyte 4', typically yttria stabilized zirconia, about 1 micron to about 100 microns thick. A selected, narrow, longitudinal segment 5, shown in FIG. 1, along the electrode axial length, is masked during deposition of the electrolyte, to provide a discontinuity, into which, an interconnect material 6' is deposited. The narrow interconnect material 6' must be electrically conductive and chemically stable both in an oxygen and in a fuel environment.

The interconnect, which covers only a small middle portion of the air electrode cross section surface, is about 5 microns to about 100 microns thick and is typically made of lanthanum chromite doped with calcium, strontium, or magnesium. Surrounding the remainder of the cell except for the narrow interconnect area is a fuel electrode 7' which functions as the anode. A typical anode is about 30 microns to 300 microns thick. A material 8', which is of the same composition as the anode, is also deposited over the interconnect 6'. This material is typically nickel zirconia or cobalt zirconia cermet and is about 50 microns to 100 microns thick.

In operation, as in the prior art, a gaseous fuel, such as hydrogen or carbon monoxide, is directed over the outside of the cell, and a source of oxygen passes through the inside of the cell. The oxygen source forms oxygen ions at the electrode-electrolyte interface, which ions migrate through the electrolyte material to the anode, while electrons are collected at the cathode, thus generating a flow of electrical current in an external load circuit. A number of cells can be connected in series by contact between the interconnect of one cell and the anode of another cell. A more complete description of the operation of this type of fuel cell interconnection system and fuel cell generator can be found in U.S. Pat. Nos. 4,490,444 and 4,395,468, herein incorporated by reference.

Figure 2:
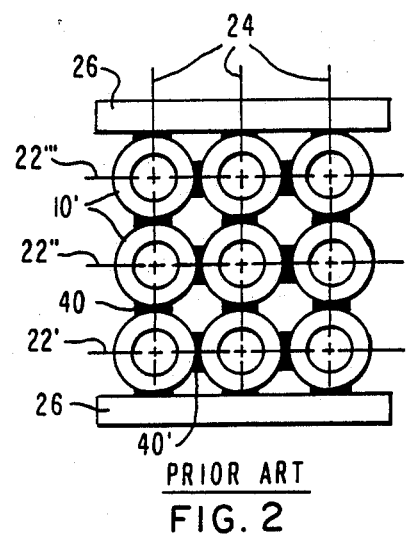
FIG. 2 is a schematic section view of a prior art series-parallel interconnection configuration.

FIG. 2 shows the prior art series electrical connection scheme as well as parallel connection between adjacent fuel cells that can be used in this invention. The cells 10' are here positioned in a series-parallel electrical connection. For descriptive purposes, the arrangement includes rows 22 and columns 24. The cells of any given row 22', 22'', 22''' are electrically interconnected in parallel through the outer electrodes and metal felts 40'. Use of the felt ensures a large contact surface and avoids potential structural damage to the outer electrodes. Consecutive cells 10 along a column 24 are electrically interconnected in series, as shown in FIG. 3, from the inner electrode of one cell to the outer electrode of the next cell through metal felts 40. Thus, each cell in a row operates at substantially the same voltage, and cumulative voltage progressively increases along the cells of a column, typically varying by approximately one volt from cell-to-cell along a column. In this manner, any number of elongated cells can be interconnected to achieve a desired voltage and current output. Other configurations, in addition to the shown rectangular array, are equally possible.

The electrical power generated by the series-parallel interconnection is readily collected by two plates 26, one in electrical contact with each cell of a row 22' at one extremity of the stack, and another in electrical contact with each cell of the row at the other extremity.

Referring again to FIG. 3, one self-supporting, axially elongated, annular design of the electronically conducting air electrode 3' of this invention is shown, with electronically conducting partition member 41, and without the thick, tubular support 2, shown in FIG. 1. This member 41 is central to the electrode and divides the oxidant chamber into two sections 42. The interior, diametrical structural member 41 allows electronic connection of the interconnection 6' to the furthest point 44 on the air electrode, and current flow from bottom to top along line I—I of FIG. 3. The rib partition can also contain two or more crossing members.

For the single diametrical partition design shown, two oxidant injector tubes 43 can be used to supply oxidant to the inner surface of the air electrode. If four crossing members are used from a point central to the fuel cell, then four oxidant injector tubes can be used, one in each divided oxidant chamber. The use of at least one electronically conducting structural member connecting at least two places on the inner circumferential wall 46 of the annular air electrode, provides a self-supporting structure, and a low resistance current path from point 44 to the interconnection 6', reducing the circumferential voltage gradient for a given cell diameter.

The self supporting air electrode of the invention can be extruded, or it can be molded in a suitable die. After it is formed, it can be sintered at from about 1300° C. to about 1600° C., to provide a strong, unitary body upon which superimposed electrolyte, and then fuel electrode, can be deposited by well known techniques. Preferably, both the central structural member(s) connecting the inner walls of the air electrode and the surrounding air electrode wall portion will be of the same material. It is possible, however, to co-extrude or insert a more highly conductive structural partition into the air electrode design, for example by elimination of pore-former in that region, or by subsequent impregnation with additional material.

The use of a structural partition 41, dividing the oxidant chamber into a plurality of sections 42, allows a relatively thin, air outer electrode wall 45 of from about 100 microns to about 2000 microns (2 mm). The electronically conductive member 41 will generally be from about 500 microns to about 5000 microns thick. These thicknesses are not to be considered limiting in any way and will depend largely on the diameter of the fuel cell tube.

Figure 4:
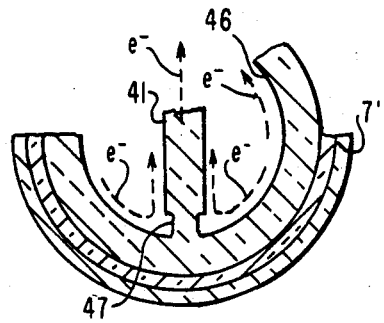
FIG. 4 is a section through the bottom of the electrode of this invention utilizing a thick interior structural partition member.

Preferably, the structural member 41 will be as thick as possible without seriously hindering oxidant feed, so that good electronic flow is achieved. If a thick interior member 41 is used, as shown in FIG. 4, a thinner cut-in section 47 opposite or away from the interconnection is preferably used, and will help oxidant diffusion, hinder electron flow, shown as $e^-$ arrows within the electrode, for only a short length, and not significantly harm strength.

Figure 5:
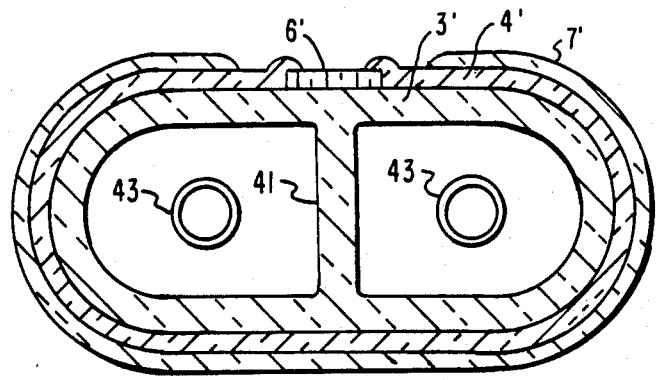
FIG. 5 is a section through an oval type of electrode design of this invention.
Figure 6:
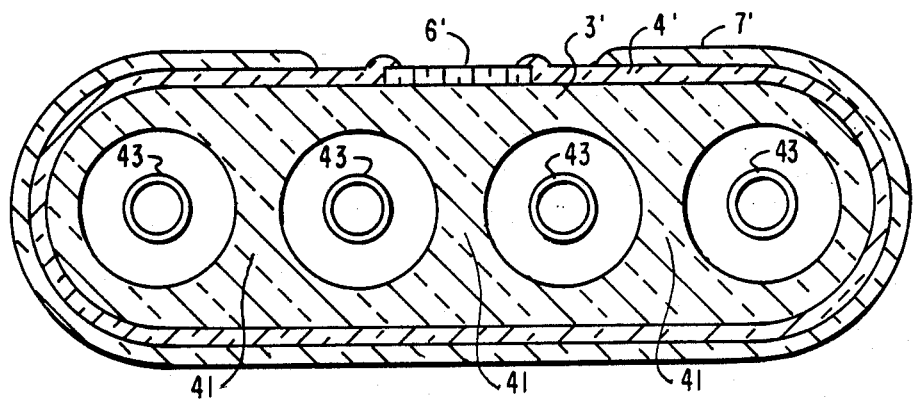
FIG. 6 is a section through a flat type of electrode design of this invention.

Additional embodiments of the self supporting electrode of this invention are shown in FIGS. 5 and 6. In FIG. 5, an oval type design is shown, and in FIG. 6 a flat type design is shown. The electrode of FIG. 5 is a somewhat flattened version of the electrode of FIGS. 3 and 4. In FIG. 5 the member 41 is still seen as connecting opposite interior walls of the electrode. In the more flattened out version of FIG. 6, circular chambers are shown, and the whole member 41 becomes less identifiable as a connecting member to interior walls, but it is still a thick structural member having the ability to channel electrons from the far sides to the narrow interconnection 6', which is deposited on the center 10% to 30% of the top air electrode structure.

I claim:

1. A porous, self-supporting, axially elongated electrode structure for a solid oxide electrolyte cell, where the electrode comprises a metal oxide material having at least two chambers through its axial length, the chambers separated by electrode material defining a structural member, said electrode structure having a contacting layer of solid electrolyte on its outer surface, and an outer layer of porous electrode on top of the electrolyte, where the outer electrode and the electrolyte have a discontinuity containing a narrow electronically conductive interconnect which extends an axial length along the self-supporting inner electrode, where electrons at points in the inner electrode farthest from the interconnect can travel to the interconnect through the structural member.

2. The electrode of claim 1, where the structural member is a single member forming two chambers.

3. The electrode of claim 1, where the structural member forms four chambers.

4. The electrode of claim 1 where the electrode is a material selected from the group consisting of $LaMnO_3$, $CaMnO_3$, $LaNiO_3$, $LaCoO_3$, $LaCrO_3$, and mixtures thereof.

5. A plurality of the electrode structures of claim 1, where the inner electrode is an air electrode, the outer electrode is a fuel electrode, the interconnect on one electrode structure is electronically connected to a fuel electrode of an adjacent electrode structure, fuel is fed to contact the fuel electrodes, and oxidant is fed to contact the air electrodes.

6. The plurality of electrode structures of claim 5, where the oxidant is fed to contact the air electrodes through an oxidant injector tube disposed within the plurality of chambers within the air electrode.

7. The plurality of electrode structures of claim 5, where the electrolyte is yttria stabilized zirconia and the fuel electrode is selected from the group consisting of nickel zirconia cermet and cobalt zirconia cermet.

* * * * *